United States Patent [19]
Colton

[11] Patent Number: 5,262,196
[45] Date of Patent: Nov. 16, 1993

[54] METHODS OF PRODUCING IMPROVED OPTICAL COATINGS

[75] Inventor: Ervin Colton, Milwaukee, Wis.

[73] Assignee: Cerac, Inc., Milwaukee, Wis.

[21] Appl. No.: 881,742

[22] Filed: May 7, 1992

Related U.S. Application Data

[62] Division of Ser. No. 712,419, Jun. 10, 1991.

[51] Int. Cl.$^5$ ............................................. B65D 5/06
[52] U.S. Cl. ................................... 427/162; 427/164; 427/165; 427/248.1; 427/255
[58] Field of Search ............ 427/166, 164, 532, 596, 427/255, 255.2, 248.1, 162

[56] References Cited

U.S. PATENT DOCUMENTS 4,661,413  4/1987  Maze et al. ........................... 428/432
4,721,657  1/1988  Takahaski et al. .................. 428/689
4,776,868  10/1988  Trotter et al. ....................... 65/18.2

OTHER PUBLICATIONS

"Stress Modification in Cerous Fluoride Films through Admixture with other Fluoride Compounds" by Pellicori in *Thin Solid Films*, 113, (1984) pp. 287-295.

*Primary Examiner*—Janyce Bell
*Attorney, Agent, or Firm*—Richard R. Mybeck

[57] ABSTRACT

New and improved non-radioactive coated lens for use in laser transmissions are created by vacuum deposition of specially prepared particles formed by melting 10-20% (w/w) barium fluoride and 90-80% (w/w) cerium fluoride in an inert atmosphere to form a mass which when cooled is comminuted into small particles for vacuum deposition upon a preselected lens substrate.

5 Claims, 5 Drawing Sheets

METHODS OF PRODUCING IMPROVED OPTICAL COATINGS

This is a division of application Ser. No. 07/712,419 filed Jun. 10, 1991.

INTRODUCTION

The present invention relates generally to lenses having improved optical and mechanical properties such as those required for laser transmission and more particularly to novel compositions for and unique methods of preparing such compositions which allows them to be deposited in thin film layers by vacuum evaporation on suitable lens substrates to provide them with optical coatings having enhanced optical and mechanical properties.

BACKGROUND OF THE INVENTION

Thin film materials have heretofore been deposited on optical lens surfaces in combinations of layers that serve to reduce the reflection of light incident on that surface or to enhance the reflection of specific wavelengths. The system of thin films comprises layers of low refractive index which are alternated with layers of high refractive index. Occasionally, layers of refractive index intermediate between the high-index and low-index materials are employed. As can be appreciated, the coating layer materials must be transparent to the energy and not absorb in the spectrum of interest. Further, the coating material must be mechanically durable to external abrasive or erosive forces. They must be in a state of low internal strain to permit adhesion and cohesion when subjected to temperature excursions. A prime requirement of coating materials is that they be easily and consistently evaporateable with standard vacuum deposition equipment.

A common coating design used heretofore consisted of up to three different layer materials to provide anti-reflection to the window or lens upon which the coating is deposited. One component of this design is required to have a refractive index in the range of 1.6 to 1.4, depending on the wavelength region for which the anti-reflection coating is intended. This relatively low index value is often satisfied by fluoride compounds of the light metals or the rare earths. Examples are magnesium fluoride for the visible region, and thorium fluoride for the infrared region between 8 and 12 micrometers wavelength.

Thorium fluoride is currently the only low index, mechanically stable material known for infrared coating applications because thorium fluoride films are free of absorption in the range of from about 200 m$\mu$ up to about 3$\mu$. A detrimental property of thorium fluoride is its radioactivity. The alpha radiation poses a sever health hazard should thorium fluoride dust be inhaled. Consequently, special handling and strict disposal problems are created whenever thorium fluoride is used. Furthermore, the radiation emitted from a coating of thorium fluoride can increase the noise background of photon detectors operating in proximity to the coated optic. Low index, transparent coating materials which can be deposited with low stress are needed to replace thorium fluoride. Examples of some potential materials are the rare earth fluorides, including cerous fluoride ($CeF_3$); lanthanum fluoride ($LaF_3$) and yttrium fluoride ($YF_3$); aluminum fluoride ($AlF_3$); barium fluoride and others.

Fluoride film layers must be deposited on substrates which are preheated to a temperature of above 200° C. in order for the layers to grow with high density, and therefore provide good mechanical integrity. However, when the fluoride film coated substrates are cooled to room temperature, they exhibit high levels of tensile stress, often high enough to disrupt the film into cracks. Pure forms of fluoride compounds in the thick layer forms required for infrared coatings generally crack due to internal stresses. Some fluoride-compound films crack upon exposure to the moisture in the ambient air.

Pulker and Maser (*Thin Solid Films*, 59 (1979) 65) reported that the addition of a few percent calcium fluoride to magnesium fluoride resulted in films having reduced intrinsic stress. Pellicori (*Thin Solid Films*, 113 (1984) 287) demonstrated that mixtures of 10% to 20% barium fluoride in cerous fluoride reduced the stress to the degree that it was possible to deposit films of this mixture having a thickness which was twice as large as that previously obtainable with pure cerous fluoride. Pellicori's deposited films could be boiled in salt water with little degradation, while films of pure cerous fluoride are destroyed by such exposure.

There is electron micrographic evidence that the microstructure of the mixed film layer is amorphous rather than the columnar form typical for fluoride layers. This glassy microstructure is denser and less permeable to water absorption so that the film layers exhibit greater stability in their optical and mechanical properties when exposed to the normal atmosphere.

The experiments referenced above were done using mixtures of fine powers of the respective compounds. However, the vacuum evaporation of such materials in powdered form is difficult because of the inevitable occurrence of outgassing of absorbed water and other gasses from the powder grains. Similarly, there is a spattering of particles found on the coated optic due to the spitting of the powders when heated. In addition, consistency in evaporation rate and deposited composition is difficult to achieve with powder mixtures. Attempts have been made to simultaneously evaporate two materials from discrete sources in the correct proportion. However, this technique requires the expensive duplication of source and control equipment, and a consistent mixing ratio is difficult to maintain. For these reasons, the apparent advantages afforded by mixtures could not be realized in coating production.

Until now, no infrared-transparent, low-refractive index material has been available which could be deposited reproducibly to form durable, low-stress, hazard-free film layers having a thickness greater than about 1000 nm with a refractive index near 1.4 to 1.6 and with very little or no absorption.

Thus a need still exists for a non-radioactive material which can be used to coat lenses for use in laser transmissions and the like and for methods of producing and applying such coatings to a lens to provide a uniform stress-free coating having a thickness of at least from about 800 to about 1800 nanometers. It is toward the definition and solution of these needs that the present invention is directed.

BRIEF SUMMARY OF THE INVENTION

The present invention relates generally to novel processes and unique reactants to produce novel homogeneous mixtures of fluoride materials which are especially well suited for deposit as thin film optical coatings. These new coatings are created as meltable homogeneous mixtures of two or more compatible fluoride compounds which alleviate the deficiencies heretofore inherent in the prior art compositions.

More particularly, the present invention provides new and improved coated lenses and methods of making them including, inter alia, melting powdered non-radioactive fluoride mixtures in a non-contaminating container disposed within an inert atmosphere, such as argon or nitrogen, or a fluorine-containing atmosphere, and thereafter cooling the melted mixture in a controlled manner to form a uniform, solid ingot. The ingot thus formed is thereafter comminuted into small pieces circa $-8$ to $+20$ mesh, which in turn are evaporated onto a preselected substrate using conventional electron beam procedures.

As will appear, the present invention enables the production of a laser transmitting lens comprising a suitable substrate having a novel and unique stress-free coating uniformly deposited thereupon. The coating contains at least 10 but not more than 20 percent by weight of barium fluoride and a remainder of cerium fluoride. The coating will provide a 1.4 refractive index at a wave length of 10.6 microns. The present invention also includes novel and unique methodology for coating such lenses in a non-radioactive environment.

Accordingly, a primary object of the present invention is to provide a new and improved lens coating material having a refractive index in the range of 1.6 (visible) to 1.4 (infrared) which can be deposited on a suitable substrate to reproducibly form durable stable, hazard-free film layers in a thickness of from at least about 800 up to about 1800 nanometers.

Still another object of the present invention is to provide new and improved methodology for producing a coated lens suitable for use with laser transmitting equipment by first admixing at least 10% but not more than about 20% barium fluoride with cerium fluoride, melting the fluoride to form a solid mass, comminuting the solid mass into small particles of from about $-8$ to about $+20$ mesh, and evaporating the resulting particles with an electron beam or the like to form a vapor which is then condensed upon a preselected substrate to form a uniform crack-free coating thereupon.

A further object of the present invention is to provide a new and improved process in which the evaporation material is compatible with resistance-heated, electron-beam evaporation, and ion-beam techniques and is transparent from the visible region to the infrared region.

Still another object of the present invention is to provide a novel and unique material that is compatible both with other layer materials of typical multilayer coating designs and with glass, germanium, and zinc sulfide substrates, for example, and can be evaporated at a consistent rate of at least 20 Å per second with constant composition, and thereafter vacuum deposited upon a suitable optical substrate utilizing either resistance-heated sources or electron-beam sources and accepted vacuum deposition techniques.

A still further object of the present invention is to provide a low index coating material that can be deposited in layer thickness of from about 1800 nm to 2000 nm sufficient to satisfy infrared coating designs without indications of cracking due to stress and which exhibits less than 2% absorption for a quarter wave optical thickness at 10 $\mu$m wavelength.

It is another object of the present invention to provide a process wherein cerous fluoride ($CeF_3$) mixed with barium fluoride ($BaF_2$) exhibits the desirable qualities set forth above, the mixture of $CeF_3$ with $BaF_2$ varying in weight ratio from 10:1 to 2:1, with the preferred ratio being 10 parts $CeF_3$ to 1 part $BaF_2$.

Still another object of the present invention is to provide a process in which fluoride compounds which are transparent in the infrared, such as $YF_3$, $LaF_3$, $AlF_3$, and the like and can be prepared to produce new materials with improved optical and mechanical properties.

These and still further objects as shall hereinafter appear are readily fulfilled by the present invention in a remarkably unexpected manner as will be readily discerned from the following detailed description of an exemplary embodiment thereof especially when read in conjunction with the accompanying drawing.

DESCRIPTION OF PREFERRED EMBODIMENTS

The present invention relates to new and improved coated lenses and methods of making them. More particularly, the methodology hereof comprises melting powdered non-radio active fluoride mixtures in non-contaminating containers in an inert atmosphere, such as argon or nitrogen, or in a fluorine-containing atmosphere, and thereafter cooling the melted mixture in a controlled manner to form a uniform, solid ingot. The ingot is then comminuted into small pieces which are thereafter evaporated and vacuum deposited onto a preselected substrate by electron beam or ion-beam procedures.

One practice of the present invention comprises the production of a laser transmitting lens having a suitable substrate upon which a novel and unique coating is uniformly deposited. The coating contains at least 10 percent but not more than 20 percent (by weight) of barium fluoride and a balance of cerium fluoride. The coated lens exhibits 1.4 refractive index at a wave length of 10.6 microns. The unique methodology for creating such lenses comprises coating a preselected substrate with non-radioactive materials including admixing powdered cerium fluoride and barium fluoride in an inert crucible formed of graphite or like non-reactive material and thereafter melting the powder mixtures in a controlled oxygen-free atmosphere created by an inert gas such as argon, nitrogen and the like, or preferably, a fluorine-containing atmosphere formed from a diluted fluorine-argon or hydrogen fluoride-argon gas stream.

The melted particles form a solid mass which is then cooled in the preselected environment to a temperature below 700° C. and thereafter removed from the controlled environment and cooled to ambient room temperature. The mass or ingot thus formed is then comminuted into small particles of between −8 and +20 mesh (circa ¼ and ⅛ inch) which are then placed in a non-reactive refractory crucible formed of carbon, titanium, molybdenum, platinum or like material, and evaporated by focusing on electron beam at the particles on the surface of the particulate mass to evaporate those particles at about 1200° C. The evaporated particles are thereafter vapor deposited a preselected substrate, which has been preheated to about 250° C., and form an adherent layer thereupon. The substrate may be suitable optical material such as glass, zinc sulfide, germanium and the like.

Figure 1:
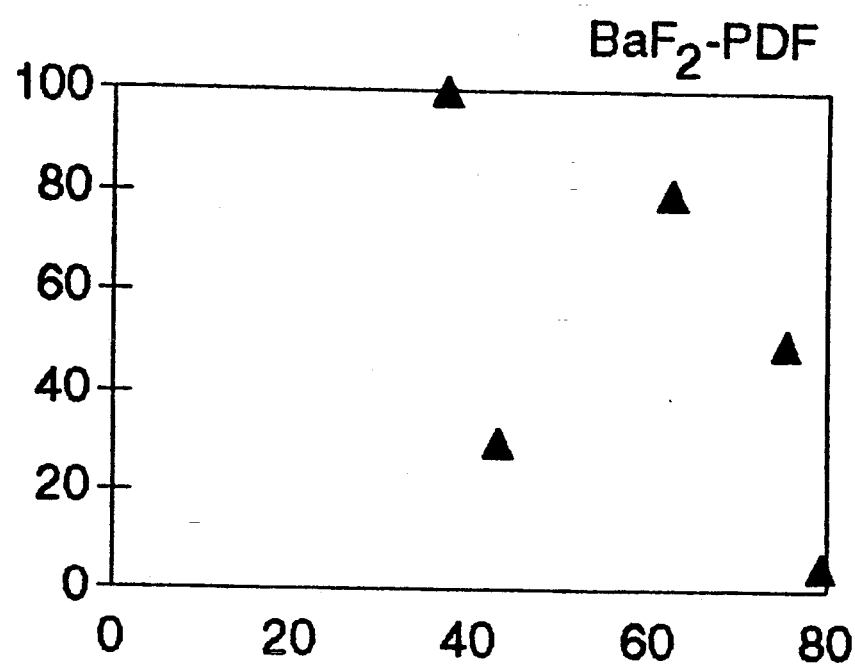
FIG. 1 is an X-ray diffraction pattern for pure $BaF_2$.
Figure 2:
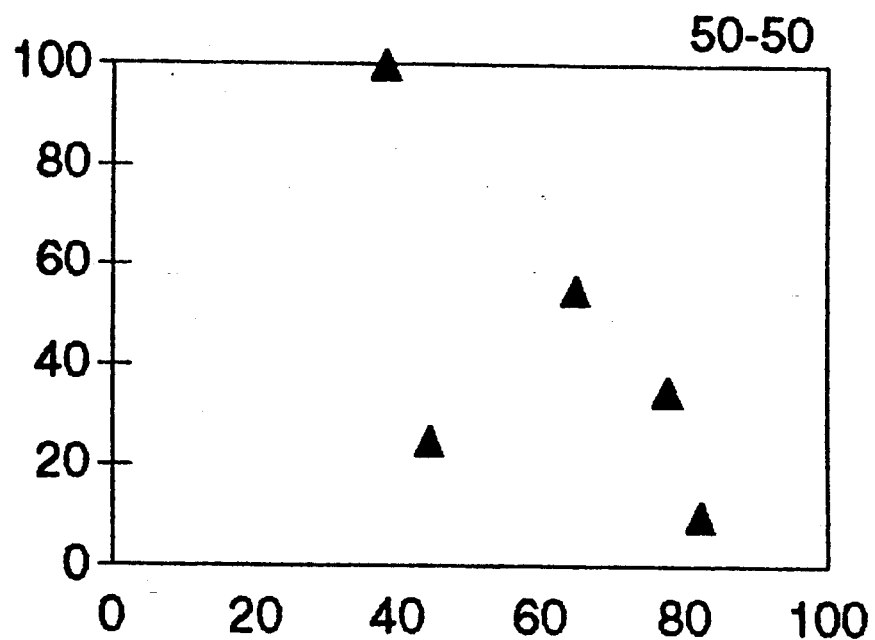
FIG. 2 is an X-ray diffraction pattern for a mixture of 50% (w/w) of $BaF_2$ and 50% (w/w) of $CeF_3$.
Figure 3:
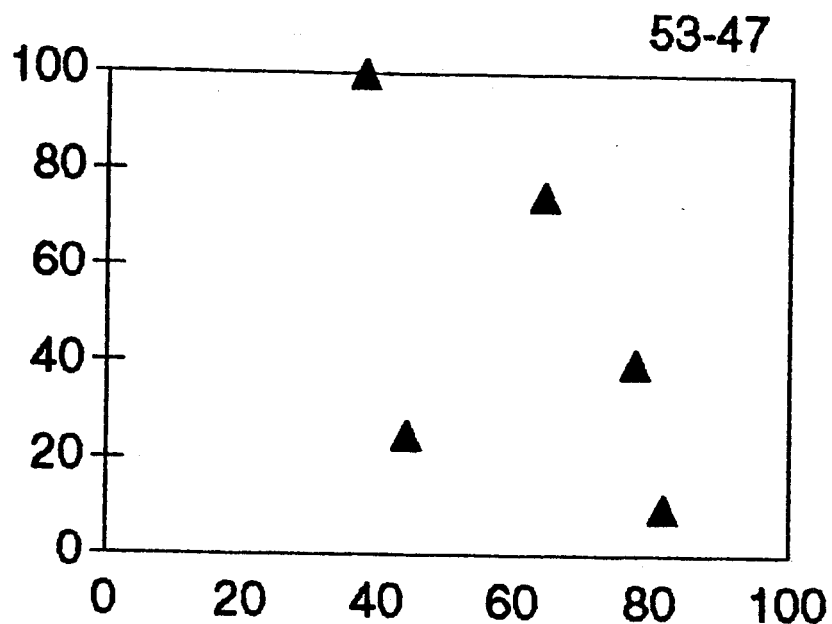
FIG. 3 is an X-ray diffraction pattern for a mixture of 53% (w/w) of $BaF_2$ and 47% (w/w) of $CeF_3$.
Figure 4:
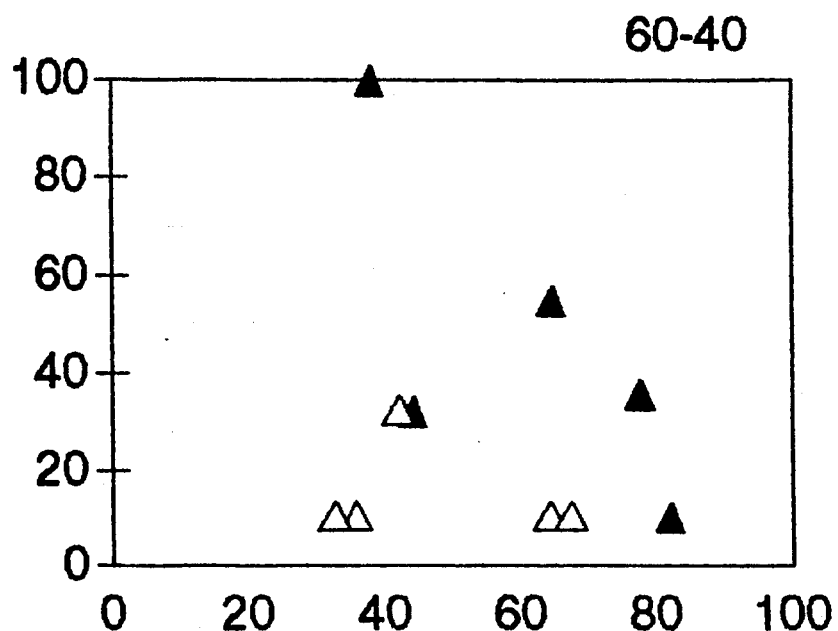
FIG. 4 is an X-ray diffraction pattern for a mixture of 60% (w/w) of $BaF_2$ and 40% (w/w) of $CeF_3$.
Figure 5:
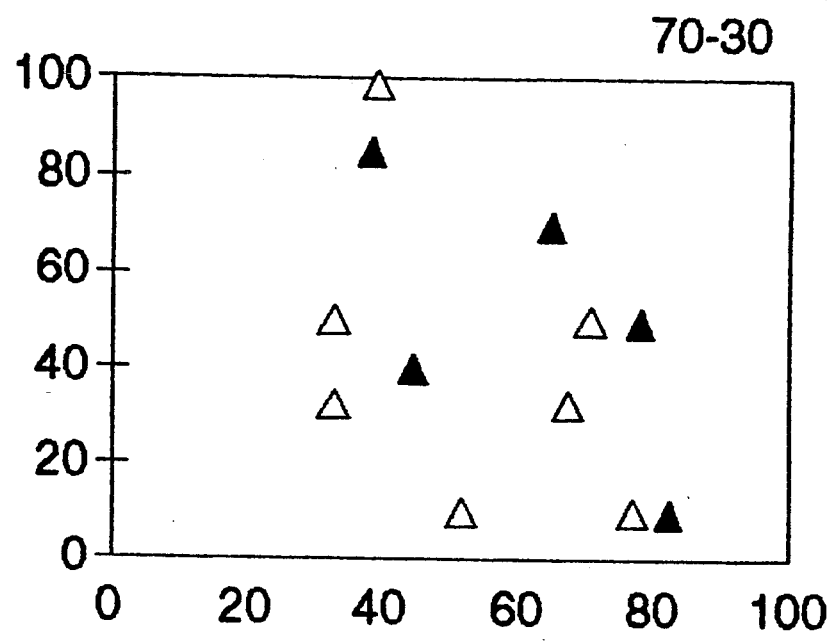
FIG. 5 is an X-ray diffraction pattern for a mixture of 70% (w/w) of $BaF_2$ and 30% (w/w) of $CeF_3$.
Figure 6:
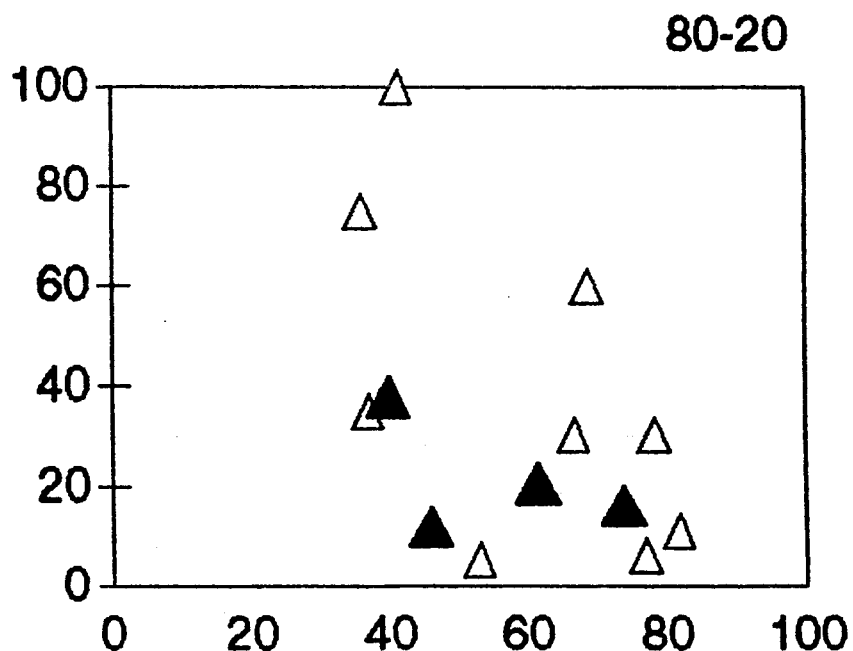
FIG. 6 is an X-ray diffraction pattern for a mixture of 80% (w/w) of $BaF_2$ and 20% (w/w) of $CeF_3$.
Figure 7:
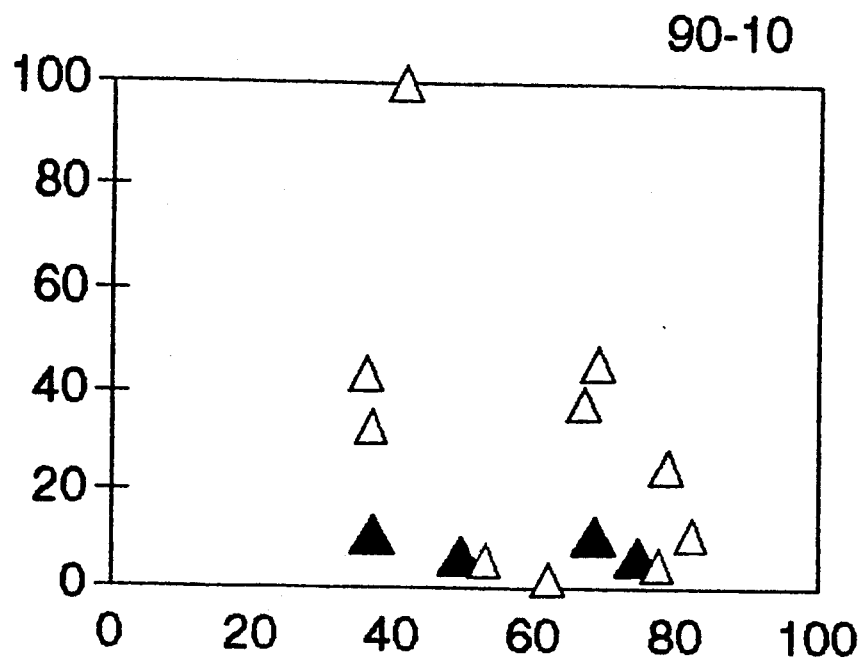
FIG. 7 is an X-ray diffraction pattern for a mixture of 90% (w/w) of $BaF_2$ and 10% (w/w) of $CeF_3$.
Figure 9:
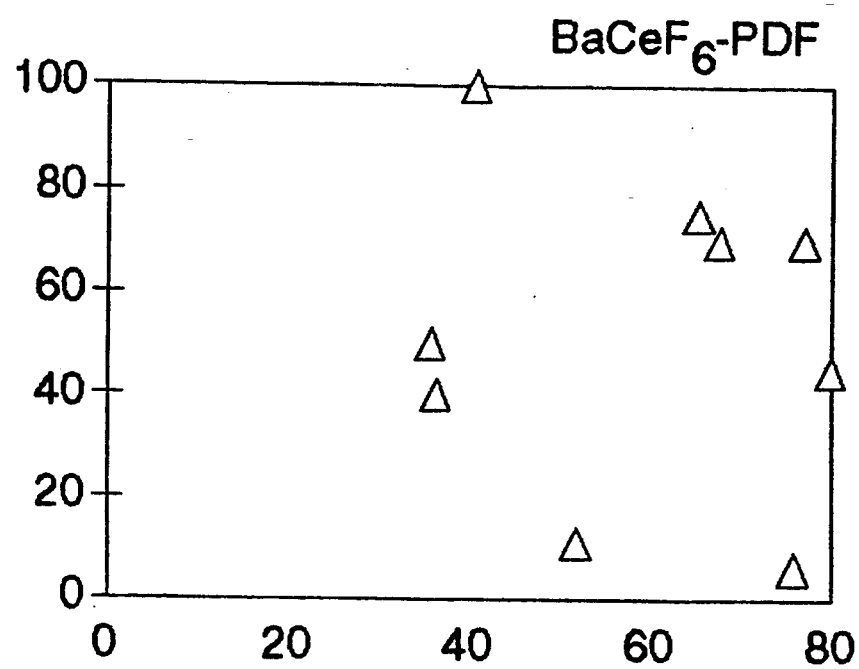
FIG. 9 is an X-ray diffraction pattern for pure $BaCeF_6$.
Figure 9:
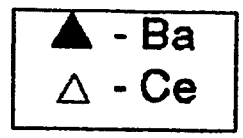

As shown in FIGS. 6 and 7, both 80-20 and 90-10 weight percent $CeF_3$-$BaF_2$ give x-ray patterns which essentially conform to that of pure $CeF_3$ with a slight increase in spacings which indicates an altered lattice cell size. However, the x-ray pattern can also be interpreted to be that of a $BaCeF_6$ (see FIG. 9) phase or some combination of this latter phase and a solid solution of $BaF_2$ in $CeF_3$.

The methodology of the present invention produces laser transmitting coated lenses by first admixing at least 10% but not more than about 20% barium fluoride with cerium fluoride, melting the fluoride to form a solid mass, comminuting the solid mass into small particles of from −8 to +20 mesh, and evaporating the resulting particles with an electron beam or other energy source to form a vapor which is then condensed upon a preselected substrate by vacuum deposition to form a uniform, crack-free, stress-free coating thereupon.

In one practice of the present invention, a mixture of 10% by weight barium fluoride and 90% cerium fluoride is produced by melting the mixed compounds in the form of fine powders in an inert atmosphere of argon or nitrogen, which preferably will also contain a specific percentage of fluoride gas. The atmosphere in the melting vessel must be free of oxygen to prevent oxidation of the compounds. A fluorine-containing atmosphere, when desired, will be formed by the introduction of any fluorine-containing gas into the closed atmosphere. The ingredients are heated in a non-contaminating vessel for a specified period of time and temperature appropriate to melt the fluoride compounds selected. The melt is allowed to cool within the oxygen-free environment to a temperature below 700° C. in a controlled manner to form a uniform, solid ingot. The ingot is then removed from the vessel and cooled to room temperature. The room temperature ingot is then comminuted using conventional equipment to form small sized particles which are suitable for loading into the crucibles of evaporation sources.

Figure 8:
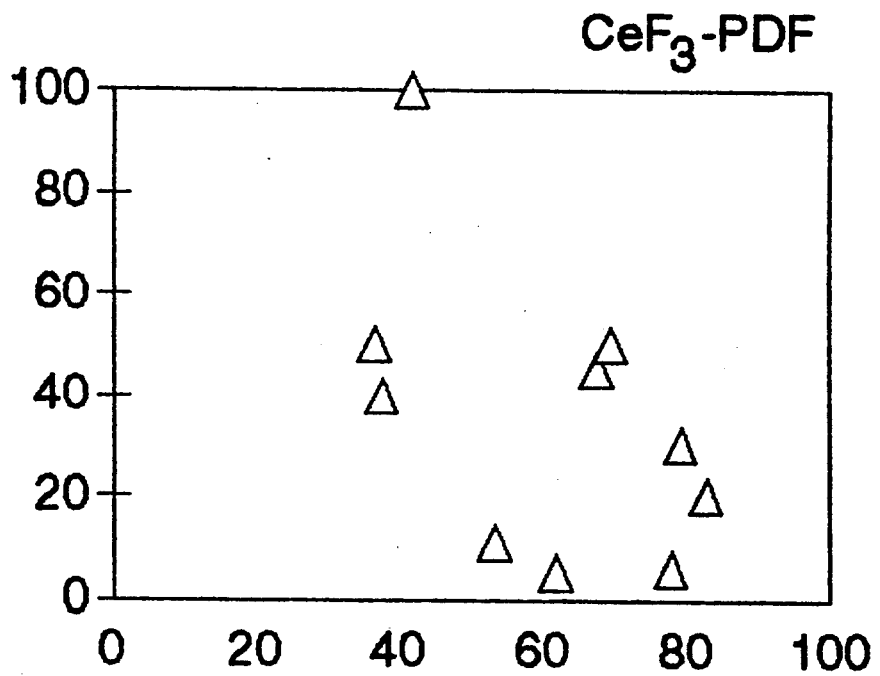
FIG. 8 is an X-ray diffraction pattern for pure $CeF_3$.

FIGS. 6 and 7 show the x-ray diffraction pattern of a material sample from $CeF_3$-$BaF_2$ ingot prepared in accordance with the present invention. The pattern corresponds to pure $CeF_3$ (see FIG. 8) but with a slight increase in spacing that indicates an altered lattice cell size. Alternatively, the pattern can be interpreted to be that of a reported $BaCeF_6$ phase (See FIG. 9), or some combination of this latter phase and a solid solution of $BaF_2$ in $CeF_3$ (See FIG. 2-5).

The raw data from which FIGS. 1-9 are drawn is shown in Tables 1-9, below, the Table number corresponding to the Figure number.

TABLE 1

| X▲ | Y▲ |
|---|---|
| 37.4 | 100 |
| 43.3 | 30 |
| 62.7 | 80 |
| 75.5 | 50 |
| 79.5 | 5 |

TABLE 2

| X▲ | Y▲ |
|---|---|
| 38.4 | 100 |
| 44.5 | 25 |
| 65 | 55 |
| 78 | 35 |
| 82.4 | 10 |

TABLE 3

| X▲ | Y▲ |
|---|---|
| 38 | 100 |
| 44.4 | 25 |
| 64.5 | 75 |
| 77.8 | 40 |
| 82 | 10 |

TABLE 4

| X △ | Y △ | X▲ | Y▲ |
|---|---|---|---|
| 36 | 10 | 38.3 | 100 |
| 37 | 10 | 44.5 | 32 |
| 41.3 | 30 | 65 | 55 |
| 66.6 | 10 | 78.1 | 35.8 |
| 68.6 | 10 | 82.4 | 10 |

TABLE 5

| X △ | Y △ | X▲ | Y▲ |
|---|---|---|---|
| 36.2 | 47 | 38.4 | 85 |
| 37 | 28 | 44.7 | 40 |
| 41.4 | 100 | 65.2 | 70 |
| 53 | 5 | 78.3 | 50 |
| 67 | 34 | 82.4 | 10 |
| 68.4 | 50 | | |
| 82 | 11 | | |

TABLE 6

| X △ | Y △ | X▲ | Y▲ |
|---|---|---|---|
| 36.1 | 75 | 38.4 | 35 |
| 37 | 35 | 44.6 | 10 |
| 41.4 | 100 | 65.1 | 18 |
| 53 | 5 | 78 | 15 |
| 66.8 | 30 | | |
| 68.7 | 60 | | |
| 77 | 6 | | |
| 78.4 | 30 | | |
| 81.8 | 11 | | |

TABLE 7

| X △ | Y △ | X▲ | Y▲ |
|---|---|---|---|
| 36.2 | 44 | 38.3 | 14 |
| 37 | 33 | 44.5 | 5 |
| 41.5 | 100 | 65 | 7 |
| 53 | 6 | 78 | 5 |
| 62 | 2 | | |
| 67 | 38 | | |
| 69 | 46 | | |
| 77.4 | 5 | | |

TABLE 7-continued

| X Δ | Y Δ | X | Y |
|---|---|---|---|
| 78.8 | 25 | | |
| 82.2 | 11 | | |

TABLE 8

| X Δ | Y Δ |
|---|---|
| 36.7 | 50 |
| 37.7 | 40 |
| 42 | 100 |
| 53.5 | 11 |
| 62 | 5 |
| 67.7 | 45 |
| 69.7 | 50 |
| 78 | 6 |
| 79.5 | 30 |
| 83 | 20 |

TABLE 9

| X Δ | Y Δ |
|---|---|
| 35.8 | 50 |
| 36.4 | 40 |
| 40.8 | 100 |
| 52 | 11 |
| 65.5 | 75 |
| 67.8 | 70 |
| 76 | 6 |
| 77.2 | 70 |
| 80 | 45 |

Figure 10:
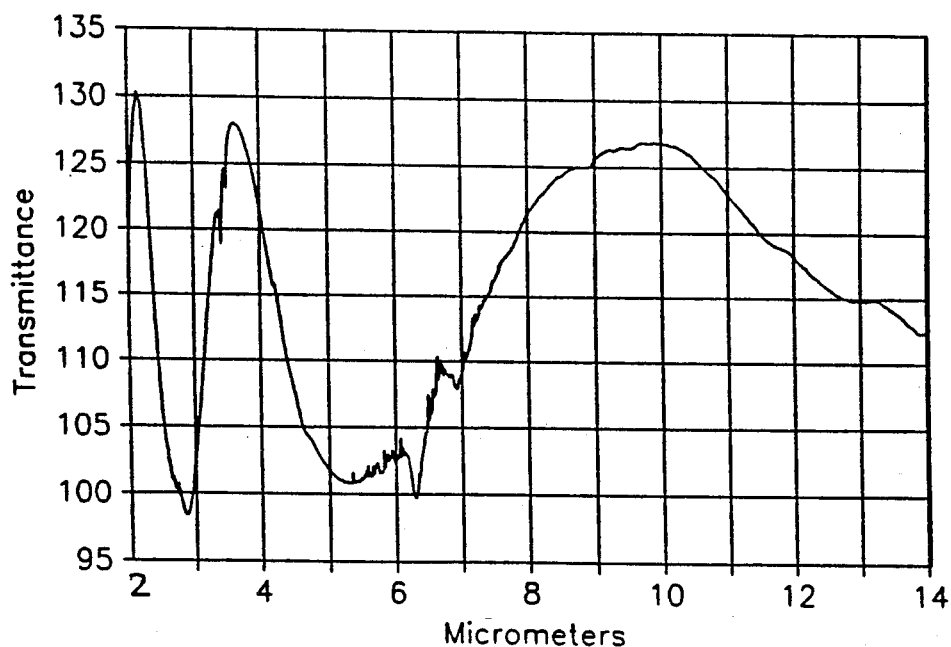
FIG. 10 is a graph showing the transmission of a mixed film of cerous fluoride and barium fluoride having a physical thickness of 1800 nm or quarter wave optical thickness near 10 $\mu$m wavelength.

FIG. 10 shows the transmission of a germanium window coated on one side with the 90% $CeF_3$-10% $BaF_2$ mixture material of quarterwave thickness is near 10 μm. The transparency is high, and the water absorption bands near 3 and 6.6 μm wavelengths are not deep.

From the foregoing, it is readily apparent that a new and useful compositions and methods of producing optical lenses therefrom has been herein described and illustrated which fulfills all of the aforestated objectives in a remarkably unexpected fashion. It is, of course, understood that such modifications, alterations and adaptations as may readily occur to the artisan confronted with this disclosure are intended within the spirit of the present invention which is limited solely by the scope of the claims appended hereto.

Accordingly, what is claimed is:

1. A method of producing a non-radioactive optical coating for deposition upon a substrate, said coating having a refractive index in the range of from about 1.6 visible to about 1.4 infrared, said method comprising: melting from about 10 to about 20 percent (w/w) barium fluoride and from about 90 to 80 percent cerium fluoride in an oxygen-free environment to form a uniform ingot; cooling said ingot to room temperature; comminuting said ingot into small particles having a size of from about −8 to about +20 mesh and free from contamination; heating said small particles to form a vacuum depositable vapor; preheating a substrate to about 250° C.; and depositing said vapor upon said preheated substrate thereby forming an adherent lens coating layer upon said preheated substrate.

2. A method according to claim 1 in which said oxygen-free environment is formed of argon or nitrogen.

3. A method according to claim 1 in which said oxygen-free environment contains fluorine.

4. A method according to claim 1 comprising the steps of cooling said ingot to about 700° C. within said oxygen-free environment; removing said ingot from said oxygen-free environment; and thereafter cooling said ingot to room temperature.

5. A method according to claim 1 in which said adherent layer forms a coating having a thickness of from about 800 to about 1800 nanometers.

* * * * *